Oct. 7, 1952 W. J. BLANCHARD ET AL 2,612,959
PROPELLER REGULATOR ASSEMBLY
Original Filed July 9, 1942 5 Sheets-Sheet 3

INVENTOR
WERNER J. BLANCHARD
CHARLES S. J. MAC NEIL
JOHN F. HAINES
THOMAS B. MARTIN
Spencer, Hardman & Fehr
ATTORNEYS Oct. 7, 1952 W. J. BLANCHARD ET AL 2,612,959
PROPELLER REGULATOR ASSEMBLY
Original Filed July 9, 1942 5 Sheets-Sheet 4
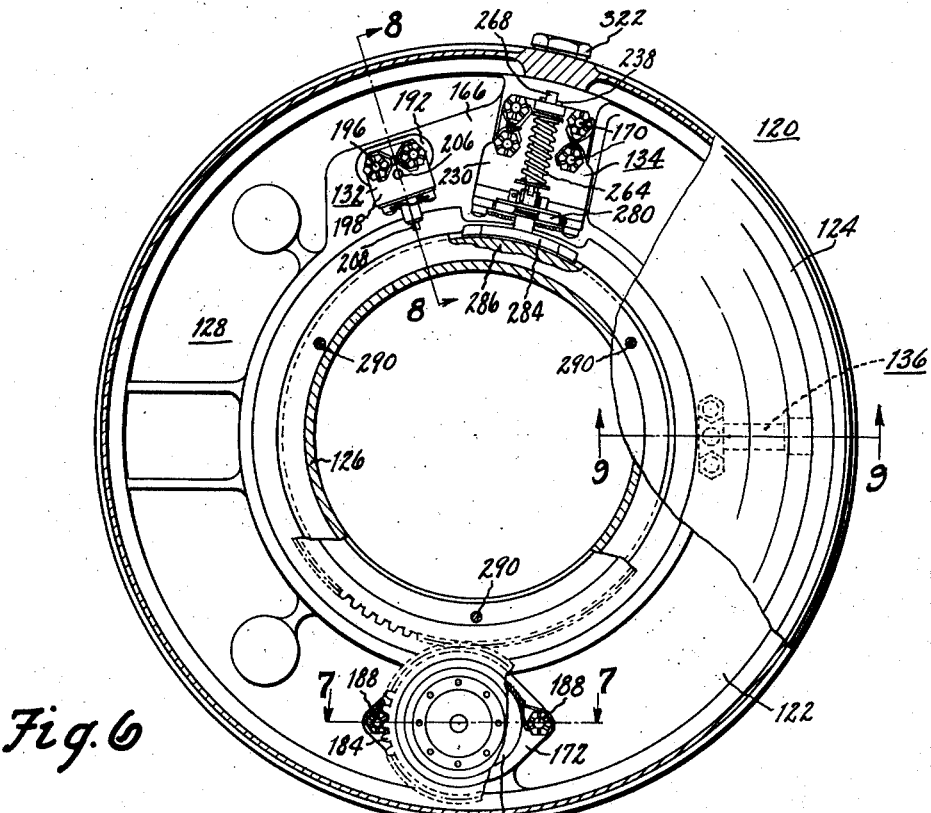
Fig. 6
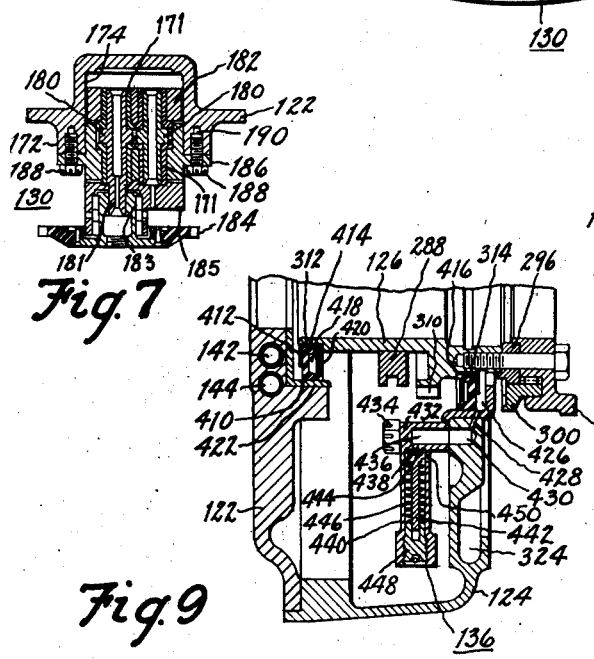
Fig. 7
Fig. 9
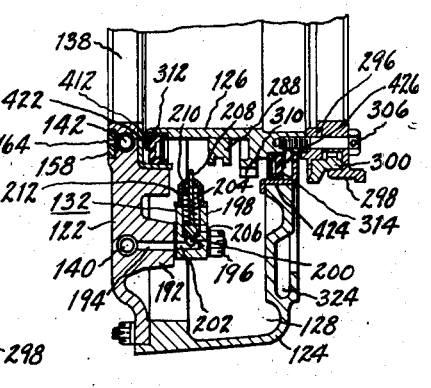
Fig. 8
INVENTOR
WERNER J. BLANCHARD
CHARLES S. J. MACNEAL
JOHN F. HAINES
THOMAS B. MARTIN
Spencer, Hardman & Fehr
ATTORNEYS Patented Oct. 7, 1952

2,612,959

UNITED STATES PATENT OFFICE 2,612,959

PROPELLER REGULATOR ASSEMBLY

Werner J. Blanchard, John F. Haines, and Thomas B. Martin, Dayton, Ohio, and Charles S. J. MacNeil, deceased, late of Dayton, Ohio, by Elise M. MacNeil, administratrix, Dayton, Ohio; said Werner J. Blanchard, John F. Haines, Thomas B. Martin, and Charles S. J. MacNeil, assignors to General Motors Corporation, Detroit, Mich., a corporation of Delaware Original application July 9, 1942, Serial No. 450,246, now Patent No. 2,405,285, dated August 6, 1946. Divided and this application September 11, 1945, Serial No. 615,522

7 Claims. (Cl. 170—160.21)

1

This invention relates to controllable pitch propellers for aircraft and is a division of S./N. 450,246, filed July 9, 1942 patented August 6, 1946 as No. 2,405,285.

It is a principal object of the invention to provide a controllable pitch propeller with a self-contained regulator mechanism for controlling the operation of the propeller in response to predetermined speed requirements.

It is a further object of the invention to provide a unitary assembly of controllable pitch propeller and regulator therefore that is susceptible of mounting and dismounting as a single unit of structure with respect to a driving shaft.

It is also an object to provide a self-contained regulator mechanism for a controllable pitch propeller in which a reservoir provides a container for a quantity of fluid pressure operating medium, and an enclosure for the control apparatus including a constant delivery pressure developing means with fluid circuit connections from the reservoir through the control mechanism and back to the reservoir, there being pressure relief and breather means for controlling the development of pressure upon the fluid pressure operating medium exposed to the reservoir.

Another object of the invention is to provide a regulator mechanism adapted for unitary assembly upon a rotating propeller hub, to rotate about a fixed sleeve from which manual control means are constantly operative to effect control of the regulator mechanism while the propeller is operating.

It is also a further object of the invention to provide a regulator assembly having its own fluid pressure system, including a reservoir rotatable with the propeller about a fixed part having seals against leakage of fluid medium contained within the reservoir, and means for minimizing loss of medium by reason of pressure differentials.

A further object of the invention is to provide fluid seal means for a housing member rotating about a fixed part, with centrifugally operated means for controlling a fluid by-pass around the fluid seal means.

Yet another object is to provide a controllable pitch propeller with a self contained regulator mechanism mounted thereon, and adapted for mounting as a unit upon a hollow shaft, with fairing or spinner means enclosing the propeller hub and regulator yet leaving the axis of the shaft open for the operation of armament.

An additional object is to adapt the rotating regulator mechanism as a support for a spinner fairing the propeller hub and blade roots.

2

Another object is to provide extension means for manipulation of a shaft and hub securing nut from an extended position of the hub, and lock the tightened nut in selected position.

A further object of the invention is to provide a piloted support for a spinner upon a hollow propeller shaft with means for securing the spinner firmly in position.

Further objects and advantages of the present invention will be apparent from the following description, reference being had to the accompanying drawings wherein a preferred embodiment of the present invention is clearly shown.

In the drawings:

Fig. 1 is a longitudinal sectional view of the complete unit mounted on an engine shaft of an aircraft.

Fig. 2 is a composite view on end of the unit, with portions broken away to show portions in section, and substantially as indicated by the line and arrows 2—2 of Fig. 1, portion a—o—b of Fig. 2 being in end elevation, portion a—o—c being in section through the spinner and part of the blade socket as indicated by the line 2—o in the upper part of Fig. 1, and portion c—o—b being in section through the spinner and rear hub sleeve extension to show the regulator housing and spinner support in elevation, substantially as indicated by the line o—2 in the lower part of Fig. 1.

Fig. 6 is an elevational view from the rear of the regulator plate and the control devices mounted thereon, with parts of the housing in section substantially as indicated by the line and arrows 6—6 of Fig. 1.

Fig. 7 is a longitudinal sectional view through the pump mechanism substantially as indicated by the line and arrows 7—7 of Fig. 6.

Fig. 8 is a sectional view through the pressure relief valve substantially as indicated by the line and arrows 8—8 of Fig. 6.

Fig. 9 is a detail view in section of the breather valve substantially as indicated by the line and arrows 9—9 of Fig. 6.

Figure 1:
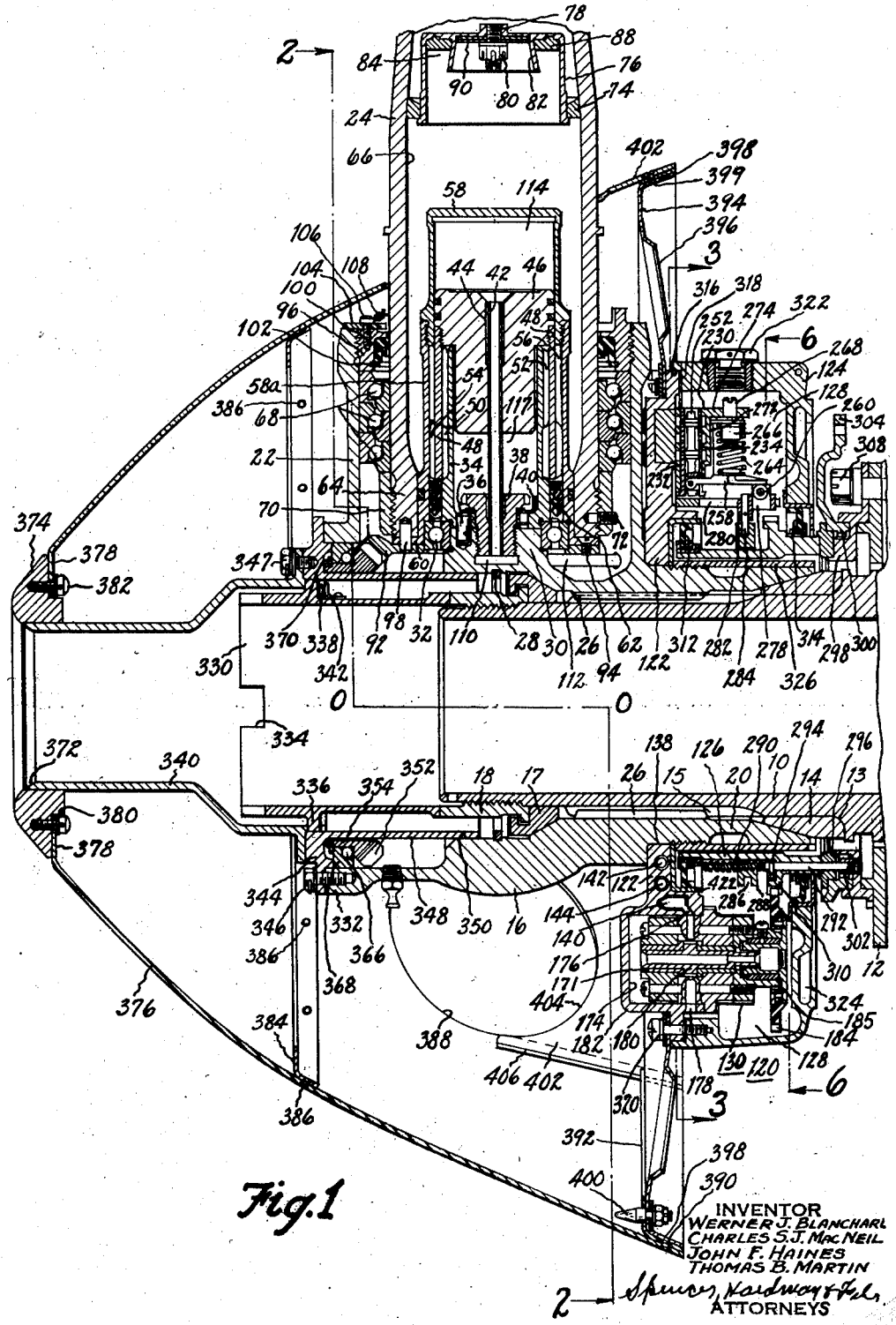
Figure 2:
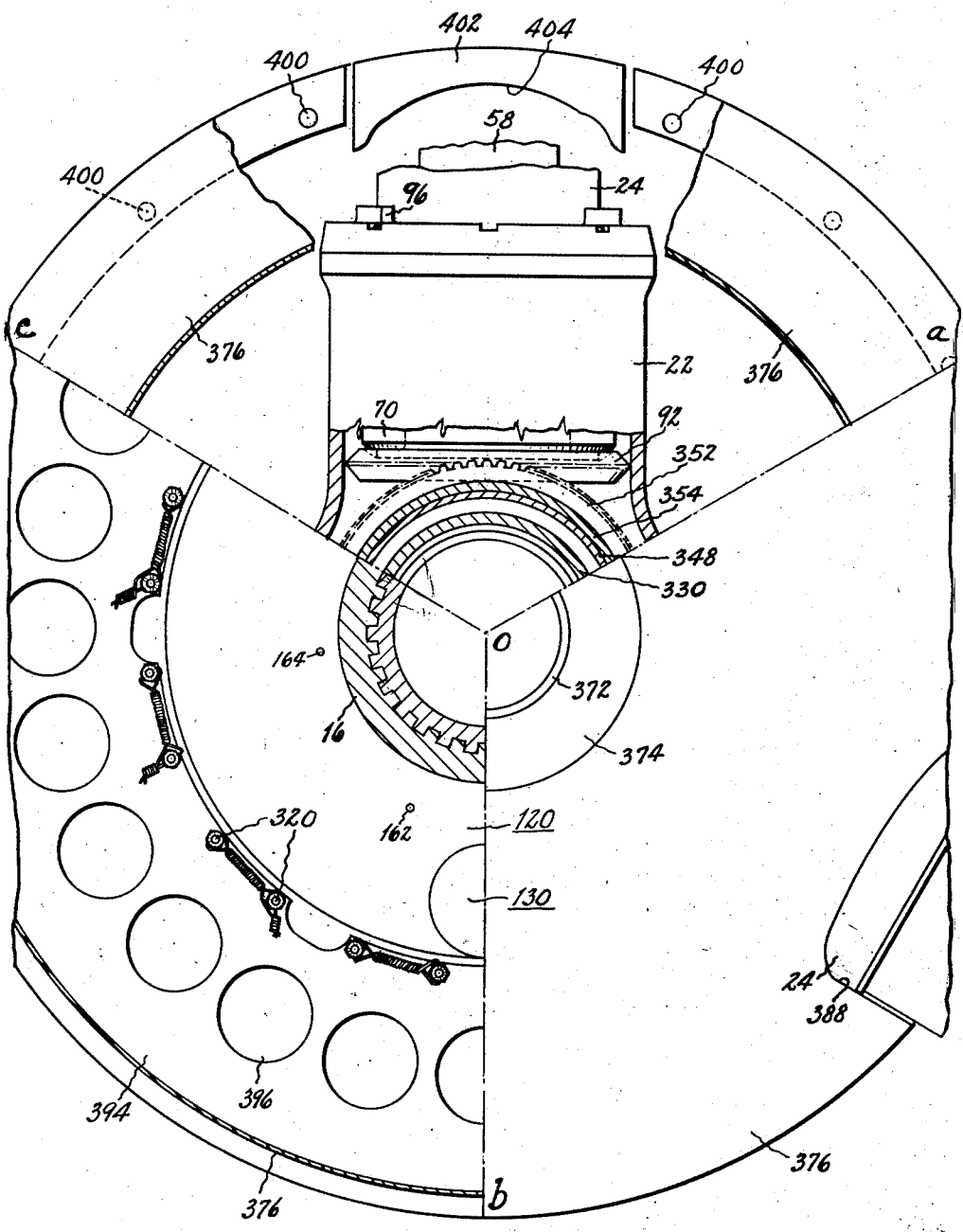

With particular reference to the drawings, the propeller under consideration is a hydraulically operated constant speed propeller assembled as a self-contained unit that mounts on the standard propeller shaft, and in front of the engine nose. To the extent of being a self contained unit, the structure consists of a hub, a set of shiftable blades, pitch changing mechanism or torque applying units for the blades, and automatic control mechanism therefore built into a single assembly complete and ready for installation and operation upon an available propeller shaft or the like indicated at 10. The engine nose, or gear casing as it is sometimes called, usually ends in a cover plate 12 outward from which the shaft 10 projects for mounting of a desired propeller. The shaft 10 provides a shoulder 13 against which is seated a rear cone 14 and in front of which is a splined section 15 having mating relation with a complementarily splined hub 16 retained in position by a front cone assembly 17 and a shaft nut 18.

In the illustrated embodiment the hub 16 has a rearwardly extending sleeve portion 20 and radiating sockets 22 for reception of blades 24. The sleeve portion 20 has a central aperture providing the splines 26 for mating with the shaft splines 15 for transmitting torque from the drive shaft to the hub assembly. At the rear of the sleeve 20 a conic surface bears upon the rear cone assembly 14 and with which it is forced into contact by the front cone assembly 17. Thus, the entire hub and blade assembly is securely mounted upon the propeller shaft 10 by axial movement of the hub assembly upon the shaft, thence engagement of the threads in the nut 18 with the threads provided at the end of the shaft 10 and tightening of the nut 18.

The forward end of the sleeve 20 provides a plurality of radially extending bosses 30 each one of which is aligned and centered with respect to a socket 22, each boss supporting an antifriction bearing 32 the outer race of which is carried by or secured to a blade, as will presently be described. Engaging the inner race of the antifriction bearing is a cup-like spline member 34 aligned with the boss 30 by means of dowels 36 where it is held firmly in positioned by means of a tubular screw 38 and a lock device 40. Secured within the screw 38 there is a tube 42 extending radially outward of the hub to be slidingly received by the central bore 44 of a piston member 46. Secured to the piston member there is a cylindrical skirt 48 whose inner lower surface is splined at 50 to mate with complementary splines 52 carried by the member 34, and whose outer surface is splined at 54 for mating relation with the splines 56 provided on the inner cylindrical surface of a blade cylinder 58.

The two pairs of splines 50, 52 and 54, 56 are characterized such that for any movement of the piston 46 along the tube 42 and within the cylinder 58, there will result a predetermined amount or rotation between the member 34 and the member 58. The hub spline 34 is maintained in nonrotative relation with respect to the hub boss 30 by means of the screw device 38 and the dowels 36, wherefore any longitudinal movement of the piston 46 relative to the hub spline 34 and the cylinder 58 will cause rotation of the cylinder 58 with respect to the blade socket 22 within which it is mounted. In the fabrication of the cylinder 58 it may for convenience be divided into two parts such as to include a tubular attaching portion 58a provided with a flange 60 engaging the outer race of the antifriction bearing 32. An oilseal 62 may also be provided such as to seal with the inside surface of the blade root 64.

The shank of the blade 24 is of a cylindrical contour and has an axial hollowed portion 66 within which is mounted the blade shifting motors or torque applying units just described. In anchoring the blade within a socket a stack of anti-friction bearings 68, here shown to be three in number, are passed over the blade root where they are retained by a blade nut 70 threaded upon the root portion 64. A lock pin 72 may be threaded or otherwise driven in to prevent rotation of the nut 70 from the end of the blade.

In the hollow 66 of the blade a little beyond the cylinder 58 an assembly is provided for individually balancing each blade against a master. For location of the balancing means, a ring 74 is secured in place within which is press fitted a cup 76 in inverted relation as shown in Fig. 1, and where it may be sweated in place. Centrally within the bottom of the cup 76 there is provided a stud 78 threaded to receive a nut 80. A smaller cup 82 having outwardly flaring walls is secured in place concentric with the bottom wall of the main cup, thus leaving an annular channel 84 for the anchorage of a predetermined quantity of lead or balancing material 88. To perfect the fineness of adjustment in blade balance, a plurality of shins 90 are provided to thread over the stud 78 where they are held in place by the nut 80.

The torque applying units, consisting of the piston 46 and its cooperating cylinder 58 mounted as stated upon the hub spline boss 30 and supporting a blade moving gear 92 mounted upon the flanges 60 of the cylinder 58 by means of screws 94, are now ready for reception of and union with the blade assembly. The blade assembly carrying the stack of bearings 68 and the blade nut 70 along with a hub nut assembly 96 is thence passed into the open end of the socket 22, and the root portion 64 of the blade is lined up to receive the projecting end of a dowel 98 secured in the flange 60 and blade gear 92. When the blade is pressed into place, which may be done by hand, the stack bearings 68 are passed within the socket and the hub nut assembly 96 threaded into place. As the nut assembly passes inward the outer faces of the stack bearings are urged inward of the socket to take up all lost motion and are preloaded by thus tightening the nut 96 against the bearing 32 to oppose centrifugal force of the revolving blade. A seal 100 retained within the nut assembly 96 by snap ring 102 closely surrounds the shank of the blade to prevent loss of lubricant. A lock plate 104 mates with aligned peripheral notches in the socket 22 where it is held in place by a screw 106 threaded with lock wire 108.

Fluid transmission to and from the hub boss 30, and thence to either side of the piston 46 is accomplished primarily as shown in Figs. 1, 4, 5, and 10, where the tube 42 secured in the nut 38 opens into a chamber 110 provided by the boss 30 and from which exit is made to the exterior of the socket 22 by means of a transfer tube 112. Thus the fluid connection exits from the chamber 114 between the cylinder 58 and pistons 46, by way of the tube 42, chamber 110 to tube 112. A similar tube 115 leads from the exterior of the socket 22 to a drilled passage 116 for reception of a tubular dowel 118 that opens through the bottom of the hub spline member 34 into a chamber 117 between the lower end of the piston 46 and the tubular screw 38. Thus when fluid under pressure is admitted through one of the tubes 112 or 115 to one side of the piston 46, then the fluid on the opposite side thereof is relieved through the other of the transfer tubes, and consequent movement of the piston 46 within the cylinder 58 results in rotation of the blade shank 24 on its bearings within the socket 22, thus effecting a shift in blade pitch.

Figure 4:
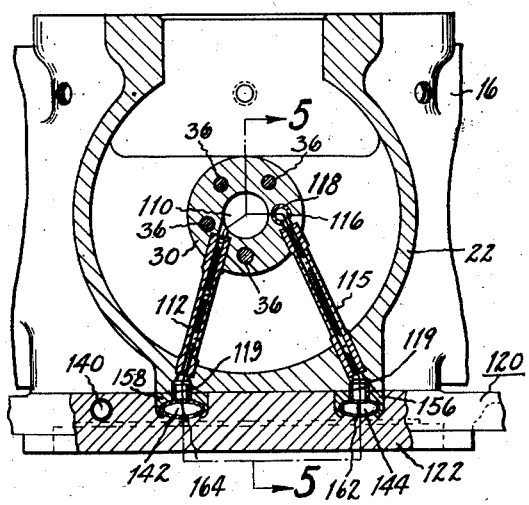
Fig. 4 is a sectional view through one of the blade sockets and the regulator plate showing the details of transfer passages substantially as indicated by the line and arrows 4—4 of Fig. 3.
Figure 5:
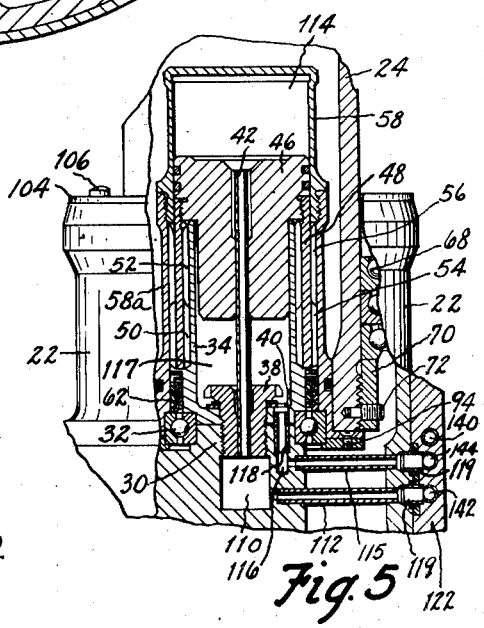
Fig. 5 is a sectional view of the blade shifting mechanism, with the fluid transfer passages shown in exaggerated relation for the purpose of illustrating more clearly the functional relation of the elements, the view being such as is generally indicated by the branched line and arrows 5—5 of Fig. 4.

In this embodiment the shift of the blade pitch is automatic and is hydraulically controlled so as to result in the speed of the propeller being substantially constant, or closely maintained with respect to a predetermined setting of a manual control device. A self-contained hydraulic regulator unit 120 is mounted on the rearward sleeve extension 20 of the hub and has fluid connection with the transfer tubes 112 and 115 by means of tubular dowels 119 as shown in Figs. 4 and 5.

The regulator comprises a plate member 122, a cover member 124 and a sleeve 126 of an adapter assembly that are mounted in sealed relation such as to provide a regulator chamber 128 of annular form and within which are mounted a pump mechanism 130, a relief valve 132, a governor valve mechanism 134 and a breather valve assembly 136, each of which is mounted on the plate member 122 or the cover 124 with appropriate connections into the fluid circuit, and each of which will be further described in their turn.

Figure 3:
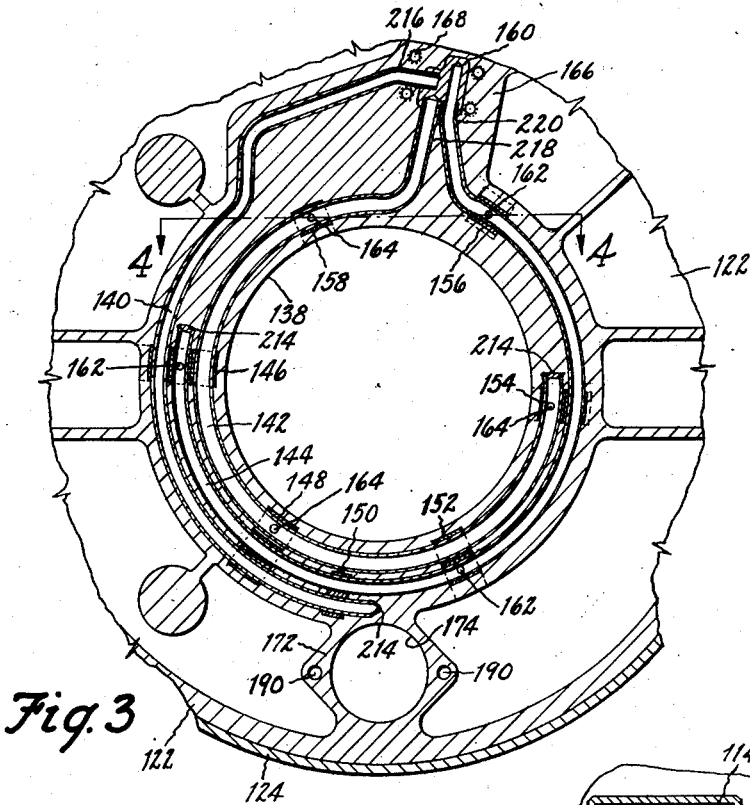
Fig. 3 is a transverse sectional view through the regulator housing substantially as indicated by the line and arrows 3—3 of Fig. 1.

The regulator plate 122 is of annular form substantially as shown in Figs. 3 and 6, having an internal diameter 138 adapted to seat closely about the tubular extension 20 of the hub and closely adjacent the radiating sockets 22, substantially as shown in Fig. 1. Embodied with the plate there is a tubage assembly comprising a supply pipe 140, and two distributing pipes or central passages 142 and 144, all of the pipes being bonded to steel pads 146, 148, 150, 152, 154, 156, 158 and mounting pad 160. The pipes or passages 140, 142 and 144 desirably comprise tube sections of preformed contour, held rigidly in associated relation by the steel pads that aid in holding the tubage assembly in predetermined relation and form to act as inserts while casting the plate 122. Certain of the pads, to wit 146, 148, 152, 154 and 156, 158 are associated in pairs as respects the distributing pipes 142 and 144. The pads 146, 152 and 156 each provide a passage 162 through the body of the plate and open into the distributing pipe 144, while the pads 148, 154 and 158 each provide a passage 164 opening into the distributing pipe 142. Thus when the plate 122 is assembled on the hub extension against the sockets 22, the distributing pipe 142 will through its passages 164 align with the tubular dowels 119 communicate with the transfer tube 112, and the distributing pipe 144 will in a like manner communicate with the transfer tube 115.

The mounting pad 160 aside from affording a rigid juncture of the tubes 140, 142 and 144 acts as a support and juncture block for mounting of the governor vlave mechanism 134 that selectively connects the pressure supply pipe 140 with either of the pipes 142 or 144. The boss 166 of the plate 122 surrounding the mounting pad 160 is drilled as at 168 for reception of mounting screws or studs 170 means of which the governor valve mechanism is supported in operative relation.

An additional boss 172 of the plate located substantially diametric of the boss 166 is drilled out at 174 to provide a chamber for reception of the pump mechanism 130, and a drill way 176 opens from the chamber 174 into the pressure tube 140. A similar drill way 178 opens from the chamber 174 through the wall of the boss to open into the regulator chamber 128 thereby providing a pump intake. Thus the pump when set into operation draws fluid in through the intake 178 and discharges it through the outlet 176 into the pressure supply tube 140 through which it is delivered to the governed valve mechanism 134 and there distributed to either of the tubes 142 or 144 as the conditions call for.

The pump mechanism 130 comprises an assemblage of intermeshing pump gears 180 enclosed with a pump casing 182 and adapted to be driven by gear 184 as will presently be explained. The pump mechanism is of the conventional constant delivery gear type as contrasted with one of intermittent delivery and is mounted by means of a flange 186 through which cap screws or the like 188 pass to thread into drill holes 190 of the boss 172. Bushings 171 seated in the casing 182 closely fit the pump gears and prevent leakage. One of the gears 180 has its shaft extended at 181 to provide a non-rounded or splined portion to afford driving relation by a hub 183 of the gear 184. To afford proper bearing surface the hub 183 is journalled in the cover plate 185 of the casing, and which by means of the spline connection 181 affords somewhat of a universal connection between the gear 184 and pump gear 180, all as is illustrated in detail in Figs. 1, 6 and 7.

The regulator plate 122 at a point between the pump mechanism 130 and the governor valve mechanism 134 provides a mounting boss 192 through which the pressure supply pipe 140 passes. In that boss a passage 194 is provided that connects into the passage 140 and opens out at the face of the boss 192. The relief valve 132 is mounted by means of screw devices 196 threaded into the boss 192. The relief valve mechanism is shown in detail in Fig. 8 and comprises a block 198 providing a valve port 200 with a passage 202 communicating with the passage 194, and a plunger recess 204 having a side port 206 opening directly into the regulator chamber 128. In the recess 204 a valve plunger 208 is assembled and urged by means of a spring 210 into closing relation with the valve port 200, the spring acting against a cap 212 secured to the body 198. The plunger valve is so characterized and positioned as to be normally closed against the port 200 by the spring 210 while the mechanism is at rest, and such that centrifugal force acting upon the valve member when the assembly is in rotation will tend to urge the valve against its seat. However, upon the development of a predetermined pressure within the pressure supply pipe 140 the valve will be raised from its seat which will allow the excess of pressure to be relieved into the regulator chamber through the port 206. Thus, the system is protected against excessive or dangerous pressure.

All of the tubes 140, 142 and 144 have their remote extremities sealed off as indicated at 214 while the opposite ends thereof 216, 218 and 220 respectively are secured in the mounting pad 160, the latter providing ports 222, 224 and 226 respectively opening from the face of the mounting pad and communicating respectively with the pipes of the tubage assembly. Thus the port 222 communicates with the pressure supply line 140 through 216, while the ports 224, 226 identify the distributing lines 142, and 144 respectively.

For selectively connecting the pressure supply line 140 with either of the distributing or control passages the governor valve mechanism 134 mounts on or over the pad 160 and automatically responds to propeller speed, or a function thereof, in accordance with a manual adjustment and setting. The governor valve assembly 134, like the pump assembly 130 and the relief valve 132, is complete in itself as a unit, and is mountable upon and removable from the supporting station of the regulator plate 120 by means of the screw devices 170 threading into the tapped drillways 168. Specifically, the governor valve assembly comprises a valve block 230 having a longitudinal bore 232 for reception of a porting sleeve 234. The sleeve 234 has a flange 236 abutting the block 230 at one end of the bore and is secured in place by a cross pin 238 at the opposite end of the block 230. The sleeve 234 is ported at 240, 242 and 244 in registry with cross bores or recesses 246, 248 and 250 extending from the mounting face of the valve block 230 across the longitudinal bore 232. The cross bores or recesses 246, 248 and 250 are so positioned as to line up with the ports 224, 222 and 226 respectively in the mounting pad 160. Within the porting sleeve 232 there is a valve member 252 having lands 254 and 256 so spaced as to coincidentally cover the ports 240 and 244, the valve member being movable along the porting sleeve 232 so as to selectively connect the port 242 with either of the ports 240 or 244.

The radially inward end of the valve member 252 has a pivotal connection 257 with a lever 258, the outer end of which rests upon a movable fulcrum roller 260. At an intermediate point the lever 258 carries a spring seat 262 for one end of a spring 264 engaging an adjusting nut 266 threaded upon a threaded stud 268. The nut 266 provides a lateral extension 270 adapted to ride in a slot 272 provided by the near side of the valve block 230. An overhanging portion 274 from the valve block is apertured to receive the member 268 which has a flange 276 for locking engagement with the extension. For supporting the fulcrum roller 260 there is a slider assembly 278 supporting the roller and riding on a pair of arms 280 secured to the inward end of the valve block 230. The slider block 278 has a depending or inwardly extending portion 282 that provides a shoe 284 adapted to travel in a circumferential groove 286 of a control ring 288.

Figure 10:
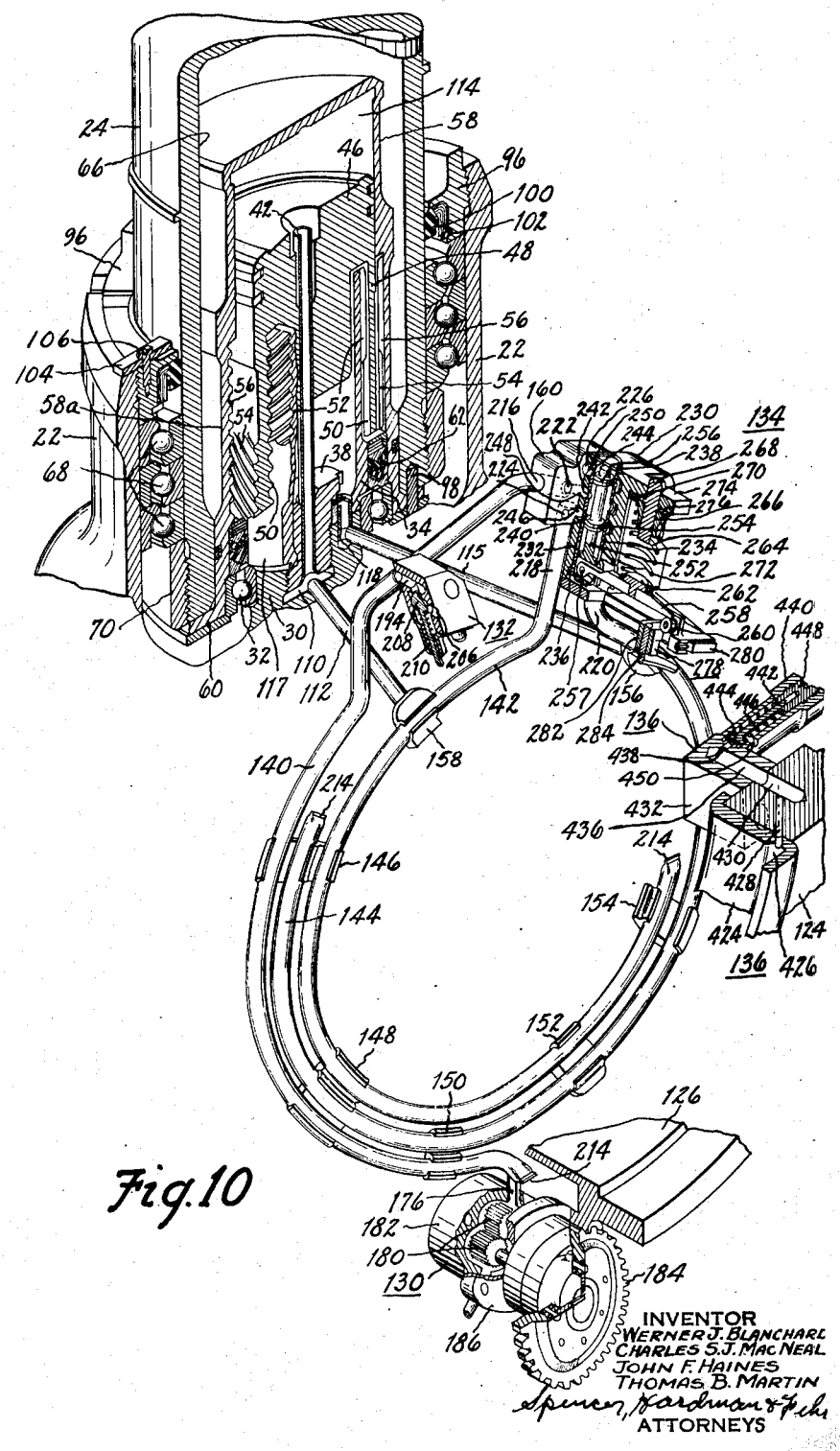
Fig. 10 is a skeletonized perspective view with parts shown in section to serve as a flow chart in tracing the fluid circuits.

With reference to Figs. 1 and 10, it will be observed that the governor or distributing valve 252 is arranged lengthwise with respect to a radius from the axis of propeller rotation o—o. It therefore responds to centrifugal force and acts against the opposing force of the spring 264 through the arm 258 having a relatively fixed point of bearing on the fulcrum roller 260. Adjustment of the spring 264 and movement of the fulcrum roller 260 along the guide arms 280 will operate to determine the point at which the valve member 252 will establish a constant speed, or in other words, will determine the speed of rotation at which the valve within the ported sleeve 234 will equalize or balance fluid pressures in the distributing lines 142 and 144. If there is an increase of speed over that for which the balance condition obtains then the valve member 252 will move radially outward and connect the fluid pressure line 140 with the distributing pipe 144 whereby pressure is admitted to that side of the piston 46 that will effect an increase in blade pitch and result in establishing so much additional load on the blades as to cause a consequent drop in speed of rotation of the propeller, which immediately brings the apparatus back to the specified setting. On the other hand, if the speed of rotation falls below the predetermined setting the spring 264 will operate to overbalance the centrifugal force on the valve member 252 which allows the valve to move radially inward toward the axis of rotation. In so doing the valve 252 operates to connect the pressure line 140 with the distributing line 142 and thence by the associated transfer tubes to the opposite side of the piston 46 which tends to decrease the pitch of the blade and allow the speed of rotation to increase.

The adjustment that is to be effected through the screw device 268 is one that is designed to be made upon the ground, or while the propeller is at rest, and is for the purpose of adjusting the governor mechanism with respect to the general requirements of the engine with which it is associated. Once it is established, it is for the most part allowed to remain in that fixed condition. In the operation of an air-craft, differing relation of propeller pitch are desirable during the cycles of engine warm-up, take-off, climb, cruising, and dive or other maneuvers. To effect manual control so as to accomplish immediate setting of the regulator mechanism best suited for the desired conditions, means are provided for shifting the fulcrum roller 260 along the guides 280 so as to modify the moments of centrifugal and spring force acting upon the lever 258 and to rearrange their relations or proportions.

Shifting of the fulcrum roller is accomplished by movement of the control ring 288 along or in the direction of the length of the sleeve 20. The ring 288 is slidably mounted on the sleeve 126, and the relative position thereof is accomplished by a plurality of screw shafts 290 having a steep pitched thread passing through the ring, and a plain portion 292 journalled in the rearward thickened portion of the sleeve 126. A stop collar 294 acts as a thrust member on the shaft 292 which also passes through a ring 296 assembled against an adapter ring 298. The adapter ring 298 is channeled to receive a ring gear 300 that meshes with pinions 302 on the end of the screw shafts 292. An arm 304 joins the ring gear 300 and has provisions for rod or cable connections leading to the pilot's compartment. Rotation of the ring gear 300 causes all of the screw shafts 290 to rotate in unison and as they do so they thread into or out of the ring 288 causing the latter to move axially of the sleeve 126. The shoe 284 riding in the groove 286 of the ring 288 transmits that reciprocable motion to the slider which carries the fulcrum roller 260 toward or away from the point of spring pressure upon the lever 258.

The sleeve 126 with the ring 288, screw shafts and rings 296, 298 and 300 may for convenience be known as an adapter assembly, and may be secured together as shown in Figs. 8 and 9 by means of screws or like devices 306. The adapter assembly constitutes a fixed assembly secured to the cover plate 12, as shown in Fig. 1, through the agency of the studs and nuts 308. When so mounted the sleeve 126 extends into the regulator chamber 128 providing an inner circular wall for the chamber. A toothed flange 310 on the sleeve 126 engages the pump driving gear 184 such that upon rotation of the propeller the pump driving gear 184 will roll about the toothed flange 310.

The opposite ends of the sleeve member 126 provide cylindrical seats on which are secured oil seals 312 and 314. The cover member 124 is rabbeted at 316 to receive a gasket 318 and to mate up with the peripheral edge of the plate 122 where it is secured by a plurality of screws or the like 320. At a point in the peripheral wall of the cover 124 opposite to the adjusting stud 268 there is provided a threaded aperture to receive a screw plug 322 which facilitates charging the chamber 128 with the proper amount of fluid, and for adjustment of the spring 264. The end wall of the cover member has formed therein an undercut or channel 324 which may be used as a slinger ring into which is discharged anti-icing fluid which may be conducted to the roots of the blade.

The regulator assembly being completed, that is, with the control elements mounted upon the plate 122 and enclosed by the cover 124 and sleeve 126, it is thence in preparation for mounting on the propeller hub which is accomplished by slipping the regulator assembly over the rearward extension 20 of the hub and thence threading into place the regulator nut 326. That being done the mechanism contained within the chamber 128 is properly oriented and hydraulically connected through the agency of tubular dowels 119 and the respective transfer tubes with the blade shifting motors or torque applying units. The hub assembly thus constructed is ready for mounting upon the propeller shaft 10 where it seats against the inner cone 14 with the adapter ring 298 secured against rotation by the case screws and nuts 308. Application of the forward cone 30, by tightening the shaft nut 18 will secure the hub in operative relation upon the shaft 10.

For maintaining the tightness of the nut 18 and also to make it more accessible in tightening the installation there is provided a sleeve assembly 330 having lug and notch engagement with the end of the nut 18 and extending forward thereof beyond the terminal rim 332 of the hub 16 and ending in wrench notches 334. Intermediate its ends the sleeve assembly provides a flange 336 appropriately notched to receive tongues 338 on the end of a spinner adapter 340. The sleeve assembly 330 also carries L-shaped leaf springs 342 having an upturned free end adapted to engage the end of the tongues 338 when they are passed through the notches of the flange 336. Closely fitting about the flange 336 of the sleeve assembly there is a flanged sleeve 344 that is secured to the terminal rim 332 by means of a plurality of screw devices 346. The member 344 has a rearward tubular extension 348 telescoping within the bore 350 of the hub 16 so as to end beneath the hub spline bosses 38. This sleeve extension forms a bearing for a coordinating gear 352 meshing with all of the blade shifting gears 92. The coordinating gear has a sleeve portion 354 machined to form the inner race of friction reducing bearing 366 whose outer race 368 is maintained in position by spring ring 370. The member 344 when brought into position by the screws 346 acts as a thrust member for the friction reducing bearing 366. Thus by appropriately mating up the sleeve assembly 330 with the nut 18, and the notched end of the spinner adapter 340 with the notched flange 336, the apertures in the flange of the spinner adapter may be properly aligned with the threaded apertures in the member 344 for reception of the screws 347. Thus a positive lock is provided for maintaining the nut 18 in tightened relation upon the end of the shaft 10.

The forward free end of the spinner adapter 340 is chamfered off at 372 to blend in with the rounded contour of a nose ring 374. The nose ring 374 forms a forward reinforcing extremity for a thin metal shell member 376 generally conic in form and which has a forward flange 378 seating in a recess 380 of the nose ring where it is firmly secured by screw devices 382. The union of the nose ring to the spinner adapter 340 is slidable, such that the spinner adapter forms a pilot for positioning the forward end of the spinner. The spinner shell 376 increases in diameter rearwardly toward the fuselage or the nose piece of the engine and ends aft of the blades 24. To rigidify the spinner shell 376, intermediate its length a ring 384 of angular cross section is secured to the spinner shell by rivets 386 or the like. At appropriate points throughout its circumference the shell 376 is notched at 388 to pass the shanks of the blades 24, while the intervening webs are secured at the terminal ends by rivets 390 to flanged arcs 392.

The base end of rear of the shell 376 is supported by means of a plate member 394 secured at its inner periphery beneath the screws 320, or at least a part of them, holding the regulator plate 122 and cover 124 in assembly. The plate 394 is provided with a series of apertures 396 located in a circular row between the inner and outer periphery. The outer periphery of the plate 394 is bent into a flange 398 that rigidifies the construction and provides a relatively flat surface for seating the flanged arcs 392. In a circular row between the flange 398 and the row of apertures 396 there are mounted a plurality of pilot studs 400 adapted to be received in apertures of the inner flange of the flanged arcs 392. At spaced points on the flange 398 removable inserts 402 are secured by screw devices 399, the forward ends of the inserts having a circular notch 404 to close about the rear circumference of the blade shank 24. These inserts are of greater width than is the width of the notch 388 in the member 376, and the opposite straight edges are offset at 406 so as to be received inside of and overlapping the member 376 along the extent of the notches, thus completing the spinner surface at the rear of the blades.

With the supporting plate 394 mounted in place, the spinner assembly is passed over the hub so as to straddle the blades and slide over the spinner adapter 340 with the base end of the shell 376 passing over the flange 398 of the plate, it being piloted by the elements 400 which screw devices secure the assembly in place.

When the assembly and installation is complete the filler plug 322 is removed and a definite quantity of hydraulic fluid is placed within the chamber 128, and with the replacement of the plug 322 the installation is ready for service. The charge of fluid used is of a quantity that would ordinarily leak out of the chamber or reservoir 128 while the apparatus is at rest, were it not for the seals 312 and 314. While the propeller is in a state of rotation the hydraulic fluid is always thrown outwardly from the axis of rotation o—o against the peripheral wall of the cover member 124, such that during a state of rotation there is no condition of leakage past the oil seals 312 and 314. While the propeller is rotating at ground level the pressures within the reservoir 128 and outside thereof are substantially equal and near to atmospheric pressure. With the propeller rotating while climbing to a higher altitude, there would develop a difference of pressure within and without the reservoir. The pressure within the reservoir would remain substantially the same as at ground level while that without at a higher elevation materially decreases, in consequence of which the hydraulic fluid within the reservoir might be forced outwardly past the oil seals 312 and 314. To overcome these difficulties the structure illustrated in Fig. 9 is made use of.

The oil seals 312, 314 may be identified as housing seal and cover seal respectively. Inasmuch as each is essentially the same in physical character the description of one will suffice. Each of the seals comprises a ring of soft flexible rubber or the like 410 of channel shape in cross section, and whose inner periphery is bonded to a flanged rigid ring 412 adapted to be press fitted or otherwise secured in a peripheral notch 414 or 416 on either end of the sleeve 126. The inside surface of the outer flange of the rubber ring is notched at 418 to receive a coil of the garter type spring 420, and which is normally under compression such as to urge the outer flange of the rubber ring radially outward. The regulator plate 122 provides a ledge in which is secured a bearing ring 422 of angular section having one leg thereof constantly in rubbing contact with the outwardly stretched flange of the rubber ring 410.

During a condition of rest the outer flange of the oil seal is forced radially outward with sufficient force by the spring 420 to prevent material leakage of hydraulic fluid at the bearing surface between the rubber ring and the bearing ring 422, and likewise the bearing ring 424 carried by the coverplate 124. Provisions are made for returning to the reservoir 126 any hydraulic fluid that may find its way past either of the seals. With respect to the cover seal, the bearing ring 424 is characterized by a shallow peripherial groove 426 in the cylindrical wall near the bend of the angle, and situated such as to be exterior of the corresponding rubber ring. An oblique radially extending drill passage 428 leads from the bottom of this channel 426 and opens into a passage 430 communicating with the reservoir 128 on the interior side of the cover 124. That construction makes possible for draining any hydraulic fluid escaping between the bearing ring and cover oil seal back into the reservoir or chamber 128, and also provides a breather between the interior and exterior of the regulator.

For controlling the passage of air or hydraulic fluid through the passages 428, 430 a centrifugally operated valve is provided that operates to close the passage while the apparatus is at rest thus preventing leakage or loss of the hydraulic fluid, and that also operates to open under certain conditions of operation such that pressures within and without the regulator may become substantially equalized.

The last mentioned structure is embodied in the breather valve referred to as 136 and comprises a block 432 adapted to be mounted upon the inner surface of the cover 124 by means of screw devices 434. The block has a passage 436 mating up with the passage 430, and from the passage 436 there leads a port 438 into a cylindrical housing 440. The housing portion 440 extends radially outward and encloses a valve rod 442 carrying a valve 444 urged by a spring 446 to close off the port 438. The outward end of the housing 440 is closed by a plug 448 that also acts to guide the rear end of the valve rod 442. Under centrifugal force the valve rod 442 and valve head 444 are moved away from covering the port 438 and opens communication between the bore 436 and the chamber 128 through one or more side ports 450. Thus under a condition of rotation any hydraulic fluid that may have worked its way to the space between the rubber ring 412 and bearing ring 424 collects in the channel 426 and by centrifugal force passes through the drill holes 428 and thence through 430, 436, 438 and 450 thereby returning to the reservoir or chamber 128. The oil drain and breather valve structure first described may be duplicated for the bearing seal 312. Through the same passages that are so provided any difference of pressure that would normally exist between the interior and exterior of the regulator housing is equalized. That is, the higher pressure within the housing may be reduced to near that of the surrounding atmosphere without the consequence of fluid leakage. Under a condition of rest the valve head 444 is spring urged to close the port 438 which thus stops leakage of the hydraulic fluid in a reverse path through the sealed drain passages. Further, the pressures within and without the reservoir will be substantially equal at all times because of the open conditions of the seal drain passages during the whole period that the craft will be changing altitude or so long as the propeller is rotating.

While the embodiment of the present invention is herein disclosed, constitutes a preferred form, it is to be understood that other forms might be adopted, all coming within the scope of the claims which follow.

What is claimed is as follows:

1. In a hydraulically controlled constant speed propeller, having a hub, the combination comprising, a regulator mechanism mounted for rotation with the hub and providing a fluid containing reservoir surrounding the hub, nonrotating means extending into the reservoir and providing oilseals engaged by the rotating part of the reservoir, a channel on said reservoir disposed adjacent an exterior surface on one of the oilseals for collecting any fluid that seeps past said one oilseal, and a breather valve within the reservoir and mounted thereon providing a valved passage for bypassing one of the oilseals, said passage connecting the bottom of said channel with the interior of said reservoir said breather valve having a weight element and being normally closed under the urge of spring pressure but adapted to open in response to a predetermined speed of rotation for venting the interior of the reservoir to outside atmosphere and to permit return to the reservoir of any fluid that has seeped past the oilseals.

2. In a propeller having a reservoir rotatable about a fixed sleeve and providing cooperating parts containing a quantity of fluid medium, the combination of means sealing the rotatable joint against loss of fluid medium and equalizing pressures within and without the reservoir, said means comprising yieldable seal rings between the rotating reservoir and fixed sleeve and having rotatable engagement with one of the cooperating parts, said one cooperating part providing a channel on the atmospheric side of the seal ring, a by-pass duct provided by said one cooperating part leading from the bottom of said channel back to the interior of the reservoir, and a centrifugally responsive valve for controlling fluid passage through said by-pass duct.

3. The combination set forth in claim 2 wherein the valve comprises a chambered block carried by said one cooperating part and providing a housing extending radially of the axis of reservoir rotation, means providing ports at the radially inward end of said housing one of which ports is in communication with the by-pass duct, a spring pressed valve plunger within said housing normally closing said one port and adapted under the urge of centrifugal force to uncover said one port.

4. In a propeller having a reservoir rotatable about a fixed sleeve and providing cooperating parts containing a quantity of fluid medium, resilient seal rings carried by the fixed sleeve and rotatively engageable with the reservoir, means on the reservoir providing an annular channel on the atmospheric side of the resilient seal, means on the reservoir providing a return passage extending from the bottom of said channel around the seal connection to open into the reservoir interior, a spring pressed valve assembly mounted within the reservoir normally closing said return passage and having a weight element responsive to centrifugal force incident to reservoir rotation for opening the passage to fluid flow through said return passage, whereby pressure within and without the reservoir will be equalized during reservoir rotation, and whereby loss of fluid from the reservoir while at rest will be prevented, any liquid medium reaching the channel on the atmospheric side of the seal being drained back to the reservoir during reservoir rotation.

5. In a hydraulically controlled constant speed propeller, a regulator mechanism for rotation with the propeller and providing a fluid containing reservoir, nonrotating means extending into the reservoir and providing oil seals engaged by the rotating part of the reservoir, constant delivery pressure developing means carried by the reservoir and having driving engagement with said nonrotative part, pressure distributing means within the reservoir supplied with fluid under pressure by said pressure developing means having an intake from said reservoir, a channel on said reservoir disposed adjacent an exterior surface of one of the oil seals for collecting any fluid that escapes past said one oil seal, and a breather valve assembly connected around one of said oil seals for returning fluid escaped past the seals to the reservoir and for equalizing the differential of pressure within and without the reservoir incident to the pressure developing means taking up fluid from said reservoir, said breather valve assembly comprising means providing a fluid passage extending from the inside of said reservoir to the bottom of said channel, a spring urged valve located within said fluid passage and including a weight element for unseating the valve at a predetermined rotative speed of the reservoir.

6. A propeller controlled mechanism for an hydraulically adjustable speed propeller of the character described which comprises a housing rotatable with the propeller shaft, a reservoir provided by said housing for receiving a quantity of pressure actuated fluid, a relatively fixed sleeve about which the reservoir is rotatable, means normally sealing the reservoir with respect to the fixed sleeve against fluid leakage, means providing a normally closed passage forming a bypass around said sealing means, a channel on the reservoir disposed adjacent an exterior surface of said sealing means, said passage connecting the bottom of said channel with the interior of said reservoir, and centrifugally controlled means operable while the mechanism is under a state of rotation to open said passage for returning fluid passing by the sealing means, to the reservoir.

7. A combination set forth in claim 6 wherein the relatively fixed sleeve extends from a nonrotating part into the reservoir, and flexible seals carried by the fixed sleeve are engageable with the said rotating part, means locating the seals at the juncture of the housing and sleeve so as to be out of contact with the pressure actuated fluid when the mechanism is rotating, and means providing the passage with a spring pressed valve, said passage and valve being carried by said rotating part for connecting the reservoir with the outside air around the seal at a predetermined speed of rotation.

WERNER J. BLANCHARD.
JOHN F. HAINES.
THOMAS B. MARTIN.
ELISE M. MacNEIL,
*Administratrix of the Estate of Charles S. J. Mac Neil, Deceased.*

REFERENCES CITED

The following references are of record in the file of this patent:

UNITED STATES PATENTS

| Number | Name | Date |
| --- | --- | --- |
| 2,113,438 | Allred | Apr. 5, 1938 |
| 2,147,078 | Barish | Feb. 14, 1939 |
| 2,307,101 | Blanchard et al. | Jan. 5, 1943 |
| 2,307,102 | Blanchard et al. | Jan. 5, 1943 |
| 2,352,336 | Martin et al. | June 27, 1944 |
| 2,357,400 | Haines | Sept. 5, 1944 |

FOREIGN PATENTS

| Number | Country | Date |
| --- | --- | --- |
| 480,082 | Germany | Mar. 14, 1939 |